Patented Aug. 31, 1937

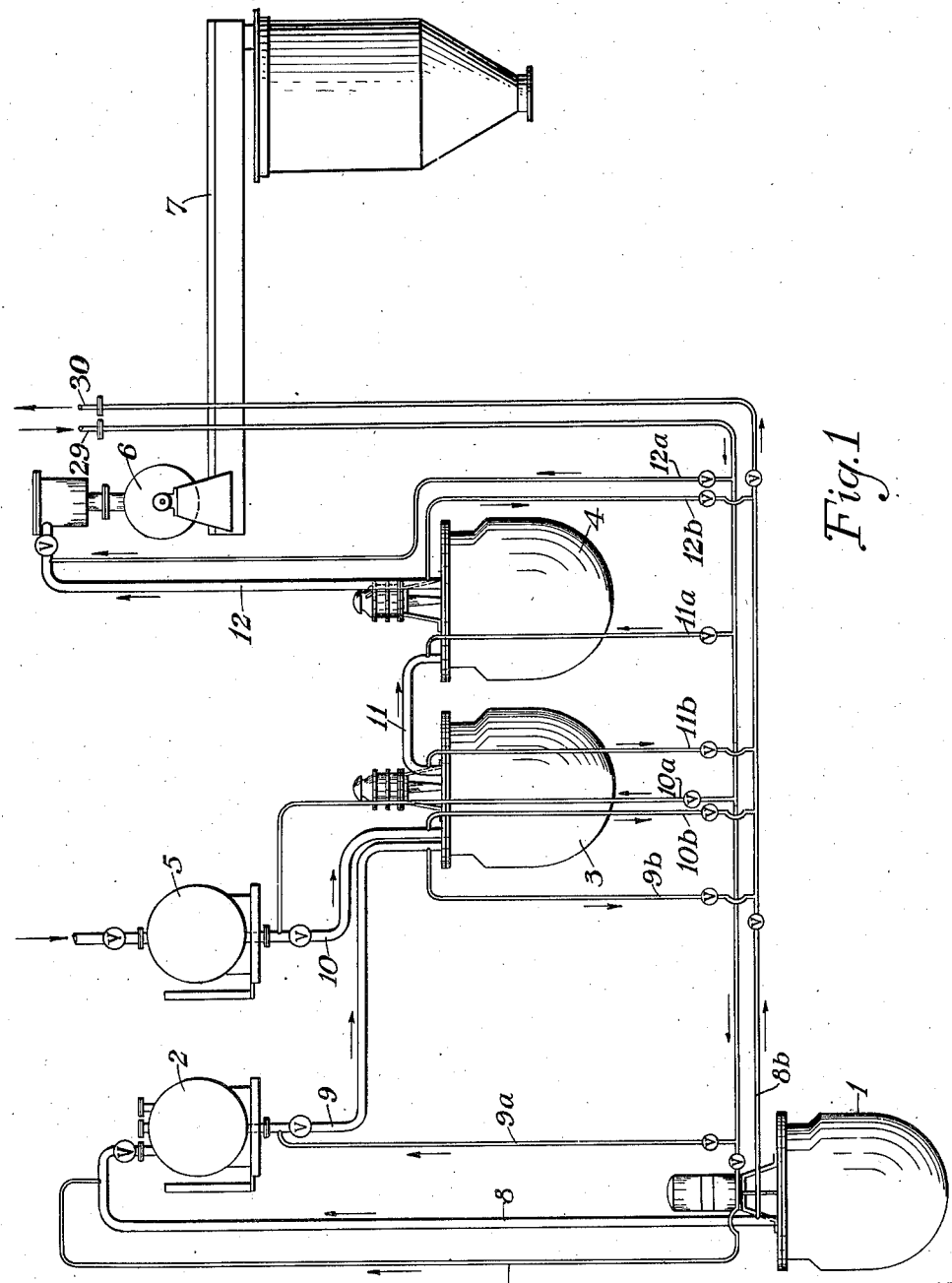

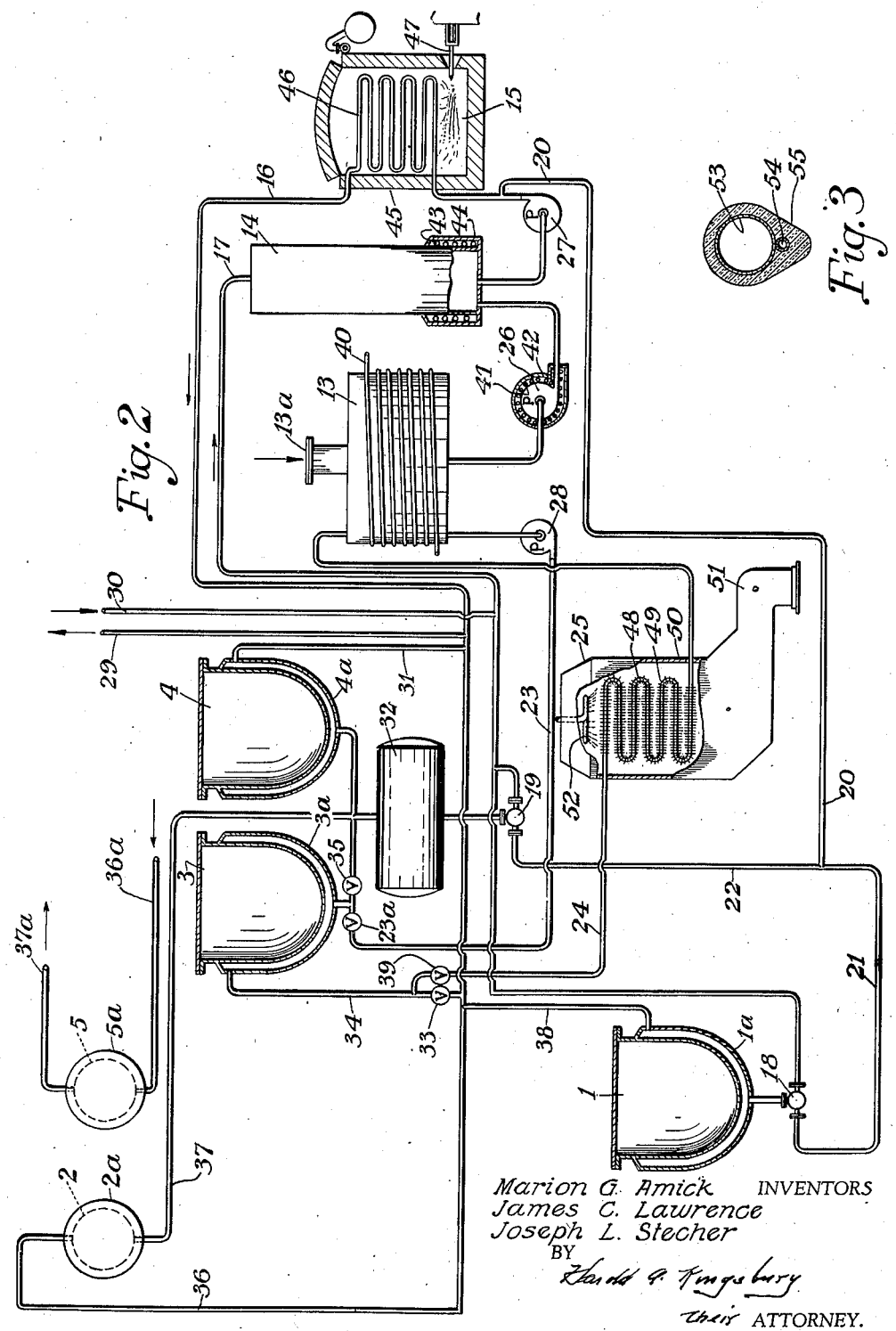

2,091,801

UNITED STATES PATENT OFFICE 2,091,801

TEMPERATURE CONTROL

Marion G. Amick, Boothwyn, and James C. Lawrence, Moylan, Pa., and Joseph L. Stecher, Wilmington, Del., assignors to E. I. du Pont de Nemours & Company, Wilmington, Del., a corporation of Delaware Application October 3, 1934, Serial No. 746,642

12 Claims. (Cl. 75—167)

This invention relates to temperature control and in particular to a method and apparatus wherein there is used as a controlling medium, a material having low vapor pressures at high temperatures, for example a medium comprising a diphenyl compound of the group consisting of diphenyl and diphenyl oxide. While the invention is not restricted thereto, it finds a particularly advantageous application in connection with the manufacture of lead sodium alloy for use in the production of alkylated lead; and therefore it is described with more particular reference to such manufacture.

A particular object of the invention is a method of temperature control wherein a controlling medium having low vapor pressures at high temperatures, e. g. a diphenyl compound, is used. A further object is a method of the character indicated particularly applicable in the manufacture of alkali metal lead alloy. A further object is an apparatus for the practice of such methods. Other objects will appear hereinafter.

These objects are accomplished as follows. In connection with an apparatus assembly for the production of lead mono-sodium alloy formed by the mixing of liquid sodium with liquid lead and including a liquid lead pot, a liquid lead scale tank, a liquid sodium scale tank, a manufacturing pot, a storage pot, and suitable connections therebetween, there is provided a temperature control system adapted to the use of e. g. a diphenyl compound. This system includes melting means, heating means, and jackets for the liquid lead scale tank, the pots, and the connections of the manufacturing assembly whereby the medium may be circulated to heat them; and further includes provisions whereby the medium may on occasion be used as a means for removing heat from the manufacturing pot, thereby to hold the temperature of the exothermic reaction at a sufficiently low temperature.

Without restricting the invention thereto, it is described with more particular reference to the apparatus shown in the accompanying drawings wherein: Figure 1 is an elementary conventional showing of a lead sodium alloy manufacturing assembly to which the present system may be applied, detailed showing of the temperature control system for the vessels being omitted; Figure 2 is a detailed conventional showing, in somewhat diagrammatic form, of the present system; and Figure 3 is a detailed cross section showing a specimen of a pipe for temperature controlling medium, and chaser line that may be used. Referring now to the drawings:—

The apparatus illustrated in Figure 1 comprises a melted lead pot 1, liquid lead scale tank 2, manufacturing pot 3, storage pot 4, liquid sodium scale tank 5, grinder 6 and conveyor 7. The various items are connected by the pipes 8, 9, 10, 11 and 12 for movement of the lead, sodium and alloy. The pots, tanks and pipes are jacketed for temperature controlling medium, the jackets of the pipes being supplied with medium from the pipe 29 by pipes 8a, 9a, 10a, 11a, 12a and the medium being returned by the pipes 8b, 9b, 10b, 11b and 12b connecting with the return pipe 30. In use, the melted lead is pumped to scale tank 2 and charged to pot 3; the melted sodium is charged to pot 3 from the scale tank 5; the alloy is pumped from pot 3 to pot 4 and then pumped to the grinder where it is cooled and ground, and is then delivered to the conveyor. The illustrated alloy—manufacturing assembly is in general accordance with that described and claimed in United States Patent 2,043,224, granted June 9, 1936, on copending application Marion G. Amick, James C. Lawrence and Joseph L. Stecher, Production of alkylated lead, Serial Number 746,643, filed of even date herewith.

Proceeding now to detailed description of the present invention and referring to Figure 2: The system comprises a melt tank 13 for melting diphenyl compound, an intermediate storage tank 14, a boiler 15, and the headers 16 and 17 for distributing and returning the diphenyl compound. The system also includes injectors 18 and 19 for returning diphenyl compound liquid condensate and any vapors from the jacket of the liquid lead pot, and the jackets of the manufacturing pot, the liquid lead scale tank, and the storage pot, to header 17, the jets being operated by liquid diphenyl compound delivered by the pipes 20, 21, and 22, from storage tank 14. Further is included a circuit whereby relatively cool diphenyl compound from the melt tank may be delivered through the pipe 23 to the jacket of the manufacturing pot and then returned to the melt tank through the pipe 24, after cooling in the cooler 25. Suitable pumps 26, 27 and 28 are provided as indicated. The lines 29 and 30 are connected with the jacket lines for the pipes 8, 9, 10, 11 and 12, as above mentioned, for the circulation of diphenyl compound therethrough.

The jacket 4a of the storage pot 4 is supplied with vapor of diphenyl compound through the pipe 31 and the condensed compound passes to the drip tank 32 and thence to the jet 19 and back to storage tank 14 through pipe 17. The jacket 3a of the manufacturing pot 3, when it is desired to heat the pot, is supplied with vapor of diphenyl compound through the valve 33 and pipe 34 and the condensed compound passes to the drip tank 32 through the valve 35 and thence to the jet 19 and back to the storage tank. The jacket 2a of tank 2 is supplied with vapor of diphenyl compound through the pipe 36 and the return is through pipe 37 to the drip tank. The jacket 1a of pot 1 is supplied through pipe 38 and the compound is returned by jet 18 as before described. The jacket of the liquid sodium scale tank is shown as heated by medium circulated through the pipes 36a, 37a; and such medium may be hot oil, or if desired the jacket may be connected with the system for circulating diphenyl compound.

In cooling the pot 3, that is, in removing heat from the pot sufficiently to hold the reaction mass at desired temperature by removal of evolved heat, diphenyl compound directly from the melt tank and therefore at comparatively low temperature, is delivered from the pipe 23 through the valve 23a (the valve 35 being closed) to the jacket 3a and passes thence through the pipe 34 and valve 39 (valve 33 being closed) to the cooler 25. As will be understood, when the system is being operated to heat the pot 3, the valves 23a and 39 are closed and the valves 33 and 35 open.

The melt tank 13 is, in the present instance, a steel tank provided with external steam coils 40 welded to the outside of the tank shell. These are for raising the temperature of the diphenyl compound to a point where it is entirely liquid. It is provided with the valved charging chute 13a. The pump 26 is a conventional multi-stage centrifugal pump equipped with external steam heating coils 41 and a housing 42 for completely lagging the entire pump casing with heat insulating medium. As will be understood, due to the temperature at which the diphenyl compound is used all stuffing boxes for packing the rotating shafts for all pumps must be adequate for such service.

The intermediate storage tank 14, in the present instance a vertical cylindrical steel tank built to withstand a working pressure of 175 lbs. per sq. in. gauge, is provided with steam coils 43 for initially melting down the diphenyl compound before starting up, and with a heat resisting covering 44. Conveniently it may be provided with a sight glass (not shown). The pumps 27 and 28 may be of the same character as the pump 26. The boiler 15 may be of the usual design for this service and thus comprise a casing 45, a coil 46 and a fuel oil burner 47.

The drip tank 32 is, in the present instance, of standard steel construction capable of standing a working pressure of approximately 175 lbs. per sq. in. gauge and is of such dimensions as to provide sufficient reservoir capacity for condensate returns from the tank 2 and the pots 3 and 4. The jets 18 and 19 are of typical injector type and, as will be understood by those skilled in the art, utilize a high pressure jet of diphenyl-compound liquor expanding in a throat or dispersion tube to cause the lower pressure fluid to be drawn into the tube by the reduction in pressure caused by the velocity of the expanding higher pressure compound, and, intermingling with this expanding compound, to be raised to a higher pressure.

The cooler 25 illustrated comprises banks of tubes 48 with exterior radiating fins 49. The tubes are enclosed in a sheet metal housing 50 providing an air duct through which a large quantity of cooling air is forced by the centrifugal fan blower 51. A spray of water 52 is directed over the tubes in the air blast, causing evaporation of the water and aiding in the lowering of the cooling temperature and consequently helping in cooling the heated compound within the tube bank. Control of this cooling system assists in the proper control of the alloy temperature in the manufacturing pot.

As will be understood, all the vessels, pipe lines, fittings and accessories that operate under a heated condition are heavily insulated with heat resisting insulation so as to retain as nearly as possible a maximum amount of heat within the vessels and so forth. All pipe line fittings such as valves, safety valves, and so forth are provided with ample steam chaser lines outside and in direct contact with the lines for diphenyl compound so as to provide a means of melting or thawing out any solid compound that may collect when the system cools down during shut down periods. For simplicity in the drawings, Figures 1 and 2, detailed showing of these features has been omitted. In Figure 3 is illustrated a typical arrangement wherein is shown a pipe 53 (e. g. pipe 16), chaser 54 and insulation 55. It is obvious that a similar arrangement may be used in connection with jacketed elements with the chaser in contact with the exterior of the jacket.

In practicing the invention with the illustrated apparatus and with diphenyl compound as the temperature controlling medium, the compound is introduced in a solid state into the melt tank 13, the chute 13a closed, and the compound melted by the heat from the coils 40. The liquid compound is pumped to the storage tank 14 that serves as a reservoir for the boiler 15. In the boiler the compound is raised in temperature until it vaporizes, and this vapor is heated up to the required temperature, e. g. 410° C. in the present case. The temperature is indicated by the vapor pressure within the boiler, and pressure gauges may be provided for this purpose. Diphenyl at a temperature of 400° C. as required to keep the lead sodium alloy in molten state has a vapor pressure of approximately 160 lbs. per sq. in. abs. and diphenyl oxide at the same temperature has a vapor pressure of approximately 146 lbs. per sq. in. abs., and a mixture has, of course, a pressure dependent on the proportions.

From the boiler 15 the vapors circulate through the heating jackets surrounding the various pieces of equipment handling liquid lead or lead sodium alloy including storage pot 4, manufacturing pot 3, liquid lead scale tank 2, and also pipe lines conveying the liquid lead, liquid sodium and lead sodium alloy throughout the system. In this way the entire system is maintained at the required temperature. The vapors are returned to the boiler system by the return piping, creating the circulation of the vapors.

From the drip tank 32 and the jacket of the liquid lead pot 1 the drip is delivered to the return pipe 17 by the jets 18 and 19. The pressure used for the diphenyl compound for the jets is approximately 290 foot head. The returns from the jets return to the intermediate storage tank. The temperature of the return diphenyl compound is approximately 375° C.

When the temperature in the manufacturing pot 3 has been raised so far as desired, the cooling arrangement is brought into use. In the alloying of lead and sodium the reaction is exothermic and unless the reaction is controlled the temperature of the alloying metals will rise to excessive values endangering the quality of the alloy as well as the apparatus. It is desirable to cool the lead sodium alloy in the manufacturing pot from temperatures in excess of 410° C. and to maintain the temperature at about 410° C. With the present equipment, this is conveniently done as heretofore indicated. That is, the valves 33 and 35 which have previously been open to permit the passage of vapor up (in the figure) the pipe 34 and into the jacket 3a and the drip to the tank 32, are closed; and the valves 23a and 39 are opened whereby the liquid diphenyl compound is circulated from the melt tank 13 through the pipe 23 and jacket 3a, down (in the figure) through pipe 34, valve 39, pipe 24, cooler 25 and back to the melt tank. The diphenyl compound from the melt tank is, for proper control, desirably at about 125 C., is at about 350° C. as delivered to the cooler, and is delivered from the cooler to the melt tank at about 125° C. As will be understood, these temperature conditions are readily maintained by proper speed of flow, the extent of the cooling by the cooler 25 and other factors.

While the temperature controlling medium may comprise only diphenyl or diphenyl oxide, a proper mixture of diphenyl and diphenyl oxide may be used, the present invention including the use of any of these. Furthermore it will be understood that the invention in many aspects is not confined to the use of diphenyl compounds. Also, while a lead sodium alloy process has been particularly referred to it is evident that the present invention is generally applicable to the control of temperature in any proper case.

It is apparent that many widely different embodiments of this invention may be made without departing from the spirit and scope thereof and, therefore, it is not intended to be limited except as indicated in the appended claims.

What is claimed is:

1. A system for maintaining the product molten in an apparatus for carrying on a reaction for the production of a normally solid product and comprising a reaction pot, and a receptacle for the product for the storage of the same after completion of said reaction and connected with said pot to receive the reaction product therefrom: such system comprising, a heating device for a fluid heating medium, a container for the fluid heating medium connected with said device, a jacket for said storage receptacle, and connections for the flow of the medium from the container to the jacket, and connections for the flow of medium from the jacket to the container, such last-named connections including a drip tank connected with said jacket, a line for the return of medium to the container, and a device between the drip tank and said line for forcing the drip into said line.

2. A system for the temperature control, by a medium comprising a diphenyl compound of the group consisting of diphenyl and diphenyl oxide, of an operating assembly for the production of lead sodium alloy comprising a liquid lead pot, a liquid lead tank, a liquid sodium tank, an alloy manufacturing pot, and connections for the flow of lead from the liquid lead pot to the liquid lead tank and from the latter to the manufacturing pot, and for the flow of sodium from the liquid sodium tank to the manufacturing pot: such system comprising a storage tank, a boiler, jackets upon elements of the operating assembly, and connections for the flow of medium from the storage tank to the boiler, from the boiler to the jackets, and from the jackets to the storage tank.

3. A system for the temperature control, with initial heating of the reaction mass and ultimate removal of heat therefrom, of an apparatus for the carrying on of exothermic reactions and including a reaction pot: such system comprising, means associated with said reaction pot for the circulation of temperature controlling medium in heat exchange relation therewith, an initial heater for the initial heating of the medium, a second heater for heating the medium to a higher temperature and connected with the initial heater, flow connections to and from the second heater and the said heat exchange means, flow connections to and from the initial heater and the said heat exchange means, and optionally operatable connections whereby the flow of medium may be directed from the initial heater to the second heater and to the heat exchange means, or from the initial heater to the heat exchange means, back to the initial heater and thence to the second heater.

4. A system for the temperature control of an operating assembly for the production of lead sodium alloy and including a reaction pot, to heat or cool the pot as required by a medium comprising a diphenyl compound of the group consisting of diphenyl and diphenyl oxide: such system comprising, a melt tank, a storage tank, a boiler, a cooler, a jacket for the reaction pot, and connections for the flow of medium from the melt tank to the storage tank, from the storage tank to the boiler, from the boiler to the jacket and from the jacket to the storage tank, and also from the melt tank to the jacket, from the latter to the cooler, and from the cooler to the melt tank.

5. A system for the temperature control of an operating assembly for the production of lead sodium alloy and including a reaction pot, to heat or cool the pot as required by a medium comprising a diphenyl compound of the group consisting of diphenyl and diphenyl oxide: such system comprising, a melt tank, a storage tank, a boiler, a cooler, a jacket for the reaction pot, and connections for the flow of medium from the melt tank to the storage tank, from the storage tank to the boiler, from the boiler to the jacket and from the jacket to the storage tank, and also from the melt tank to the jacket, from the latter to the cooler, and from the cooler to the melt tank; said connections including a valved pipe from the boiler to the jacket, a valved pipe from the jacket to the storage tank, a valved pipe from the melt tank to the jacket, and a valved pipe from the first-named valved pipe to the cooler and connected with such pipe between the valve and the jacket, whereby by closure of the first and second pipes and opening of the other pipes flow direct from the boiler and back to the storage tank is interrupted and flow from the melt tank to the jacket and back to the melt tank by way of the cooler is established.

6. A system for the temperature control, by a medium comprising a diphenyl compound of the group consisting of diphenyl and diphenyl oxide, of an operating assembly for the production of lead sodium alloy comprising a liquid lead pot, a liquid lead tank, a liquid sodium tank, an alloy manufacturing pot, a storage pot, and connections for the flow of lead from the liquid lead pot to the liquid lead tank and from the latter to the manufacturing pot, the flow of sodium from the liquid sodium tank to the manufacturing pot, and the flow of alloy from the manufacturing pot to the storage pot; such system comprising a melt tank, a storage tank, a boiler, a cooler, jackets upon elements of the operating assembly, and connections for the flow of medium from the melt tank to the storage tank, from the storage tank to the boiler, from the boiler to the jackets and from the jackets to the storage tank, and also from the melt tank to the jacket of the manufacturing pot, from the latter to the cooler, and from the cooler to the melt tank.

7. In the production of a normally solid product of high melting point, to be produced in a molten condition by an exothermic reaction requiring initial heating, and later cooling to prevent excessive temperature rise while yet maintaining the reaction mass molten, the method of initially heating the reaction pot, and then removing heat therefrom, which method comprises: providing a temperature controlling medium having low vapor pressures at high temperatures and distributed in three lots arranged for circulation from the first, to the second, to the third; maintaining the first lot at a temperature such that medium therefrom will exert a material cooling effect on the reaction pot, the second lot at a temperature between those of the first and third lots, and the third under vaporization and at a temperature such that medium therefrom will heat the reaction mass to the molten state; initially circulating the vaporized medium from the third lot to the reaction pot to heat the same, and returning the medium to the second lot; and thereafter circulating the medium from the first lot to the reaction pot to cool the same, thereby saiding the temperature of the medium, cooling the medium to about the temperature of the first lot, and then returning it thereto.

8. In the production of a normally solid product of high melting point, to be produced in a molten condition by an exothermic reaction requiring initial heating, and later cooling to prevent excessive temperature rise while yet maintaining the reaction mass molten, the method of simultaneously cooling the reaction pot and heating a material receptacle cooperatively associated with the pot and for maintaining the contained material in molten state and cooperatively conditioned with the molten product in the reaction pot, which method comprises: providing a temperature controlling medium having low vapor pressures at high temperatures and distributed in three lots arranged for the circulation from the first, to the second, to the third; maintaining the first lot at a temperature such that medium therefrom will exert a cooling effect on the reaction pot, the second lot at a temperature between those of the first and third lots, and the third under vaporization and at a temperature such that medium therefrom will heat the material receptacle to maintain the material therein in a molten state; circulating vaporized medium from the third lot to the said receptacle to heat the same, and returning the medium to the second lot; and at the same time circulating medium from the first lot to the reaction pot to cool the same, thereby raising the temperature of such medium, cooling the same and then returning it to the first lot, whence it may circulate to the second lot, to the third lot, and so on.

9. In the production of lead sodium alloy, the method of initially heating the reaction pot, and then removing heat therefrom, which method comprises: providing a liquid lot of a medium comprising a diphenyl compound of the group consisting of diphenyl and diphenyl oxide, at approximately 125° C., a second lot at approximately 375° C., and a third lot under vaporization and at approximately 410° C., with circulation from the first, to the second, to the third lot; initially circulating the vapor of the medium to the reaction pot to heat the same and returning the medium to the second lot, and thereafter circulating the medium from the first lot to the reaction pot to cool the same, thereby raising the temperature of the medium, cooling the medium to approximately 125° C., and then returning it to the first lot.

10. In the production of lead sodium alloy, the method of initially heating the reaction pot, and then removing heat therefrom, which method comprises: providing a liquid lot of diphenyl at approximately 125° C., a second lot at approximately 375° C., and a third lot under vaporization and at approximately 410° C., with circulation from the first, to the second, to the third lot; initially circulating the diphenyl vapor to the reaction pot to heat the same and returning the diphenyl to the second lot, and thereafter circulating the diphenyl from the first lot to the reaction pot to cool the same, thereby raising the temperature of the diphenyl, cooling the diphenyl to approximately 125° C., and then returning it to the first lot.

11. In the production of lead sodium alloy, the method of simultaneously cooling the reaction pot and heating a material receptacle cooperatively associated with the pot and for maintaining such material in molten state and cooperatively conditioned with the molten alloy in the reaction pot by means of a medium comprising a diphenyl compound of the group consisting of diphenyl and diphenyl oxide, which method comprises: providing a liquid lot of medium at approximately 125° C., a second lot at approximately 375° C., and a third lot under vaporization and at approximately 410° C., with circulation from the first, to the second, to the third lot; circulating the vapor of the medium from the third lot to the said receptacle to heat the same, and returning the medium to the second lot; and at the same time circulating the medium from the first lot to the reaction pot to cool the same, thereby raising the temperature of the medium, cooling the medium to approximately 125° C. and then returning it to the first lot, whence it may circulate to the second lot, to the third lot, and so on.

12. In the production of lead sodium alloy, the method of simultaneously cooling the reaction pot and heating a material receptacle cooperatively associated with the pot and for maintaining such material in molten state and cooperatively conditioned with the molten alloy in the reaction pot by means of diphenyl, which method comprises: providing a liquid lot of diphenyl at approximately 125° C., a second lot at approximately 375° C., and a third lot under vaporization and at approximately 410° C., with circulation from the first, to the second, to the third lot; circulating the diphenyl vapor from the third lot to the said receptacle to heat the same, and returning the diphenyl to the second lot; and at the same time circulating the diphenyl from the first lot to the reaction pot to cool the same, thereby raising the temperature of the diphenyl, cooling the diphenyl to approximately 125° C. and then returning it to the first lot, whence it may circulate to the second lot, to the third lot, and so on.

MARION G. AMICK.
JAMES C. LAWRENCE.
JOSEPH L. STECHER.

CERTIFICATE OF CORRECTION.

Patent No. 2,091,801.                                             August 31, 1937.

MARION G. AMICK, ET AL.

It is hereby certified that error appears in the printed specification of the above numbered patent requiring correction as follows: Page 4, first column, line 30, for "saiding" read raising; and that the said Letters Patent should be read with this correction therein that the same may conform to the record of the case in the Patent Office.

Signed and sealed this 25th day of January, A. D. 1938.

(Seal)

Henry Van Arsdale,
Acting Commissioner of Patents.